(12) United States Patent
Hsieh et al.

(10) Patent No.: US 6,714,743 B2
(45) Date of Patent: Mar. 30, 2004

(54) WIDE RANGE TUNABLE FILTER

(75) Inventors: Yung-Chieh Hsieh, San Jose, CA (US); Chiayu Ai, Newark, CA (US); Chang-Tsung Lin, Fremont, CA (US)

(73) Assignee: Optoplex Corporation, Fremont, CA (US)

(*) Notice: Subject to any disclaimer, the term of this patent is extended or adjusted under 35 U.S.C. 154(b) by 244 days.

(21) Appl. No.: 09/813,052

(22) Filed: Mar. 19, 2001

(65) Prior Publication Data

US 2003/0007225 A1 Jan. 9, 2003

Related U.S. Application Data

(60) Provisional application No. 60/273,107, filed on Mar. 2, 2001.

(51) Int. Cl.[7] .................................................. H04J 14/06
(52) U.S. Cl. ........................... 398/212; 398/79; 359/251
(58) Field of Search ............................ 398/212, 79, 82, 398/65; 359/251

(56) References Cited

U.S. PATENT DOCUMENTS

| | | | |
|---|---|---|---|
| 5,488,500 A | 1/1996 | Glance | 359/127 |
| RE37,044 E | 2/2001 | Wu | 349/117 |
| 6,275,322 B1 * | 8/2001 | Tai | 359/279 |
| 6,362,904 B1 * | 3/2002 | Cormack | 359/127 |

* cited by examiner

*Primary Examiner*—Scott J. Sugarman
*Assistant Examiner*—Richard Hanig
(74) *Attorney, Agent, or Firm*—John P. Wooldridge

(57) ABSTRACT

A wide range tunable filter is provided. A randomly polarized incoming beam is converted into two orthogonally polarized beams. A ½ wave plate and filter block turns these two beams into four beams. Two of the four beams have a single range of wavelengths and two beams have the remaining wavelengths. Each pair of beams is orthogonally polarized. A ½ wave plate and birefringent crystal positioned after the filter block combine the two beams having the single range of wavelengths and combines the two beams having the remaining wavelengths. The invention includes a thermal compensator to correct the angle of the filter with respect to the incident light.

28 Claims, 4 Drawing Sheets

WIDE RANGE TUNABLE FILTER

This application claims priority to Provisional Patent Application Serial No. 60/273,107, titled "A Wide-Range Tunable Filter," filed Mar. 2, 2001, and incorporated herein by reference.

BACKGROUND OF THE INVENTION

1. Field of the Invention

The present invention relates to optical communication, and more specifically, it relates to tunable add/drop filters used in optical communication.

2. Description of Related Art

In optical networks, a variety of methodologies have been provided in the prior art for optical switching and interconnecting of the transport network layers.

Cheung, ("Acousto-Optic Tunable Filters in Narrowband WDM networks: System Issues and Network Applications," IEEE J. Sele. Area Comm. 8(6), 1015, 1990.) uses four 1×N demultiplexers and N's 2×2 optical switches. The structure is complicated and the interconnections are difficult.

An add/drop filter has been proposed by Glance at AT&T. (Glance, "Tunable add/drop optical filter providing arbitrary channel arrangement", IEEE Photon. Lett, 7(11), 1303, 1995 and U.S. Pat. No. 5,488,500.) This filter seeks to provide the advantage of arbitrary channel arrangement, but still suffers a costly 6 dB optical coupling loss, because of the two-array waveguide grating demultiplexers used in the structure.

Another type of wavelength-space switch (Dono et al, "A wavelength division multiple access network for computer communication", IEEE J. Sol. Area Comm., 8(6), 983, 1990.) has been widely used in various WDM networks, for example the IBM Rainbow Network. This structure uses a passive star-coupler that combines and splits the incoming light signals into N receivers. The receivers are built with a tunable filter and select the desired channels. It has the broadcast capability and the control structure of this implementation is very simple. However, an undesirable feature of the broadcast star is that the splitting loss can be very high when the users number is large.

U.S. Pat. No. RE037,044, titled "Tunable Add/Drop Optical Filter" describes a tunable optical add/drop filter for all-optical wavelength-division-multiplexing (WDM) network applications. This filter can add or drop part of the high transmission capacity signals of a WDM link. It is intended for use to decentralized access points in the access network or as a small core network node to realize branching points in the network topology. It is intended to work in both the wavelength and space domains.

SUMMARY OF THE INVENTION

It is an object of the present invention to provide embodiments of a wide band tunable filter.

It is another object of the invention to provide techniques for maintaining the beam propagation directions over the wavelength tuning range of a tunable filter.

It is another object of the invention to provide techniques for maintaining the beam separation over the wavelength tuning range of a tunable filter.

Still another object is to provide a four-port device that can add and drop wavelength channels simultaneously.

Another object of the invention is to provide a thermal compensator to compensate for heat induced pass-band changes.

These and other object will be apparent to those skilled in the art based on the disclosure herein.

According to the present invention, in one embodiment of a tunable filter, a randomly polarized incoming beam normally incident upon a birefringent crystal is separated into separate o- and e-ray beams. The E-field (polarization) orientation of the o-ray, after emerging from the crystal, is orthogonal to that of the e-ray. A ½ wave plate placed in one beam causes the two rays to have the same polarization direction. A filter block comprising optically transparent material, and further comprising a mirror and a bandpass filter is placed in the path of the o-ray and the e-ray. Wavelengths within the passband of the filter are passed for the o- and e-rays. The wavelengths not within the passband are reflected from the filter and reflected by the mirror to produce second o-ray and e-ray beams that include all of the light that was not passed by the passband filter. Thus, the filter block turns the o-ray into a top o-ray and a bottom o-ray and turns the e-ray into a top e-ray and a bottom e-ray. In this embodiment, the bottom rays carry light of wavelengths that are within the filter's pass band and the top rays carry the rest of light.

A birefringent crystal is positioned after the filter block. A ½ wave plate is attached to the crystal to intercept the top e-ray and bottom e-ray, but not to intercept the top o-ray and the bottom o-ray, The ½ wave plate rotates the polarization direction of top e-ray and bottom e-ray to be orthogonal to the polarizations of the top o-ray and the bottom o-ray. The top o-ray and top e-ray combine in the second birefringent crystal to produce a combined top beam. The bottom o-ray and bottom e-ray combine in the crystal to form a combined bottom beam.

An embodiment of the invention is thus a three-port device. From one input beam, the invention produces two output beams. The input port carries all the wavelengths injected into the system and the bottom output port carries the light with wavelengths that pass through the filter. The top output port carries the light reflected by the filter.

Embodiments of the invention include configurations where light reflected by the mirror impinges on a second drop filter, which passes certain wavelengths and reflects all the others. The mirror can be formed from a coating over the incidence surface of filter block, which surface has a non-coated portion to allow entry of the o and e rays. The exit surface of the filter block can have a plurality of bandpass filters positioned to successively pass selected wavelengths. In an alternate embodiment, a series of the devices of FIGS. 1A and 1B are connected to the top output port to operate as a demultiplexer. These principles apply to the embodiments provided below as well.

The wavelength in the bottom output port is determined by the transmission band of the filter, which can be adjusted by changing the incident angle to the filter. The disadvantage is that, as the incident angle changes, the two output beams shift laterally. This problem is fixed by adding a plane parallel plate (dummy block) in the optical path. The material and thickness of dummy block are the same as those of the filter block. Adding another plane parallel plate to the bottom beam path compensates for the thickness of filter. When the filter block is rotated, the dummy block is correspondingly rotated in the opposite direction. Such arrangement will guarantee that the bottom beam remains in the same location no matter how the filter block is rotated.

The invention includes embodiments that substitute a first and second polarizing beamsplitter (PBS) and mirror combination for the birefringent crystals of the above-described embodiment.

Another embodiment is provided which places a bandpass filter coating on the input side of the filter block. Wavelengths within the band pass of the filter coating are transmitted through the filter and the remaining wavelengths are reflected to a corner cube. The corner cube reflects light incident thereon back to a reflective coating placed on the input side of the filter block. The light reflected from this mirror coating is reflected back towards the input direction. This embodiment is a three-port device.

A 4-port device is provided, which can add and drop wavelengths simultaneously. In this embodiment, the filter block includes a filter coating, an attached mirror and an attached mirror block. The mirror block has an attached mirror. A dummy block with an adherent dummy glass is operatively positioned next to mirror block. In operation, an input beam passes through the filter block and impinges on filter coating. Light having wavelengths within the passband of filter coating will pass through the filter coating and will pass through the dummy glass. The remaining light will be reflected by the filter coating and be further reflected by the mirror, from which the light will propagate through the dummy block. In one embodiment, the filter coating is designed to reflect a narrow wavelength band, such that a single wavelength is reflected therefrom. The reflected channel becomes the main channel of the device. An added channel is introduced into the system by injecting a beam through filter block and mirror block so that the beam reflects from the mirror attached to the mirror block and is made collinear with the other beam reflected from the filter and propagates therewith out of the system.

The separation between e- and o-ray are not necessary when the incident angle is close to normal incident Since under that condition, the filter response to P- and S-polarization is about the same. The disadvantage of operating in the small incident angle is that the tuning range is small. The advantage is that one does not need to convert the incident polarization into a pure S- or P-state.

Assuming that when the incident angle onto the filter is fixed, higher temperatures shift the filter pass-band to the longer side. The invention includes a thermal compensator to correct the angle of the filter with respect to the incident light

DETAILED DESCRIPTION OF THE INVENTION

Figure 1A:
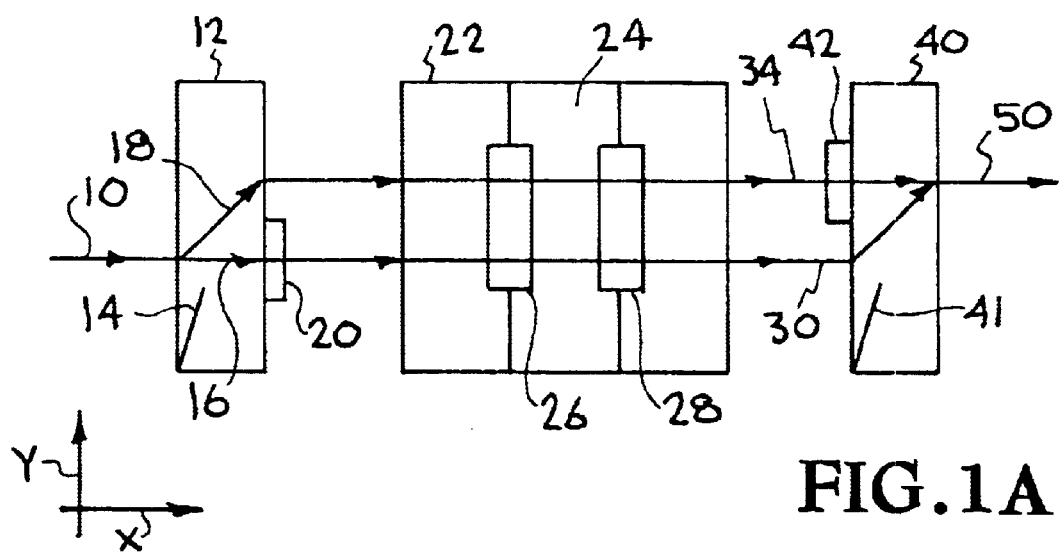
FIG. 1A is a top view of a tunable filter of the present invention.
Figure 1B:
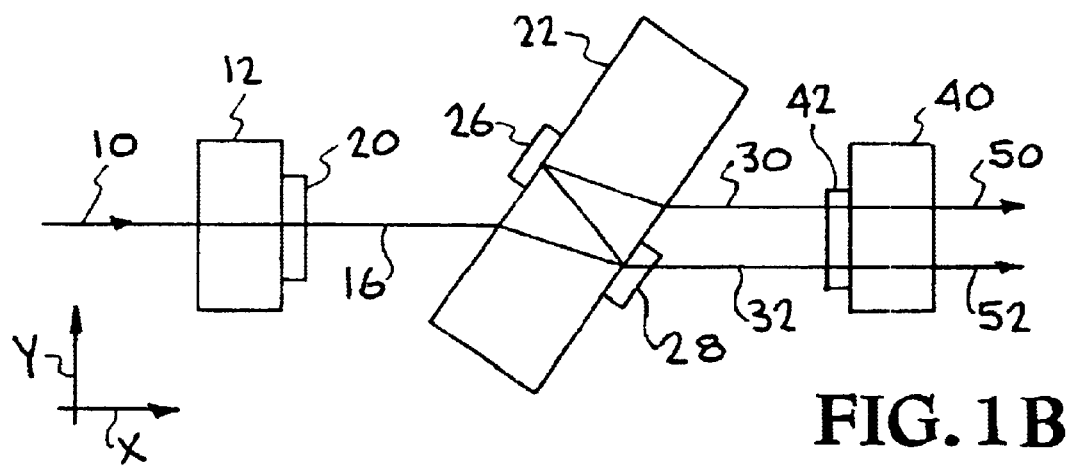
FIG. 1B is a side view of the tunable filter of FIG. 1A.

FIG. 1A is a top view and FIG. 1B is a side view of the structure of a tunable filter. An incoming beam 10 having a random polarization is normally incident on a birefringent crystal 12 having an optical axis 14 that is oriented in the X-Y plane as shown in FIG. 1A. After passing through the crystal, the o- and e-ray are spatially separated. The optical path of the o-ray 16 is propagating in its original direction and the e-ray 18 deviates with respect to the o-ray. The E-field (polarization) orientation of o-ray 16 right after emerging from the crystal 12 is along the Z-direction and that of e-ray 18 is along Y-direction (i.e., they are orthogonal). A ½ wave plate 20 is positioned to intercept o-ray 16, but not e-ray 18. The fast axis of ½ wave plate 20 is oriented at 45° degrees from the Y-axis within the Y-Z plane (between the polarization direction of o-ray 16 and e-ray 18). This causes the E-field of the o-ray 16 to rotate 90 degrees to the Y-direction. The two rays thus have the same polarization direction when they are incident on the filter block 22. Filter block 22 comprises an optically transparent material 24 such as glass, and further comprises a mirror 26 and a filter 28. The figure shows the mirror 26 and the filter 28 fixedly attached to the optically transparent material 24, however, it is not required that these elements be attached.

FIG. 1B is a side view of FIG. 1A. Thus, o-ray 16 is shown to obstruct the view of e-ray 18. Filter block is placed at an angle with respect to o-ray 16 and e-ray 18, and both rays travel similar paths parallel to each other. O-ray 16 and e-ray 18 are incident on filter block 22 at an angle and propagate through filter block 22 to filter 28. Any wavelengths of light that are within the pass band of filter 28 propagate through filter 28. The remaining light that is not within the pass band of filter 28 is reflected by filter 28 and propagates back through filter block 22 to mirror 26, which reflects the light out of the filter block. Thus, filter block 22 turns o-ray 16 into top o-ray 30 and bottom o-ray 32 and turns e-ray 18 into top e-ray 34 and bottom e-ray 36, the views of which are obscured in FIG. 1B by top o-ray 30 and bottom o-ray 32. The bottom rays carry light of wavelengths that are within the filter's pass band and the top rays carry the rest of light.

Referring again to FIG. 1A, top o-ray 30 obscures the view of bottom o-ray 32 and top e-ray 34 obscures the view of bottom e-ray 36. A birefringent crystal 40, with its optical axis 41 oriented in the same direction as optical axis 14, is positioned after the filter block 22. A ½ wave plate 42, with its fast axis oriented 45 degrees from the Y axis in the Y-Z plane is attached to the crystal 40, to intercept top e-ray 34 and bottom e-ray 36, but not to intercept top o-ray 30 and bottom o-ray 32. The ½ wave plate 42 rotates the polarization direction of top e-ray 34 and bottom e-ray 36 to be in the Z-direction right before they enter crystal 40. Since top o-ray 30 and bottom o-ray 32 do not pass through the ½ wave plate, their direction of propagation is in the Y-direction right before they enter the crystal 40. As shown in FIGS. 1A and 1B, top o-ray 30 and top e-ray 34 combine to produce a combined top beam 50. As shown only in FIG. 1B, bottom o-ray 32 and bottom e-ray 36 combine to form a combined bottom beam 52. The view of combined bottom beam 52 is obscured by combined top beam 50 in FIG. 1A.

An embodiment of the invention is thus a three-port device. From one input beam 10, the invention produces two output beams are 50 and 52. The input port carries all the wavelengths injected into the system and the bottom output port carries the light with wavelengths that pass through the filter. The top output port carries the light reflected by the filter (referring to FIG. 1B).

As required, detailed embodiments of the present invention are disclosed herein. However, it is to be understood that the disclosed embodiments are merely exemplary of the present invention that may be embodied in various systems. Therefore, specific details disclosed herein are not to be interpreted as limiting, but rather as a basis for the claims and as a representative basis for teaching one skilled in the art to variously practice the present invention.

It should be recognized by those skilled in the art that embodiments of the invention include configurations where light reflected by mirror 26 impinges on a second drop filter, which passes certain wavelengths and reflects all the others. The mirror 26 can include a coating over the incidence surface of filter block 22, which surface has a non-coated portion to allow entry of the o and e rays. The exit surface of the filter block can have a plurality of bandpass filters positioned to successively pass selected wavelengths. In an alternate embodiment, a series of the devices of FIGS. 1A and 1B are connected to the top output port to operate as a demultiplexer. These principles apply to the embodiments provided below as well.

Filter Tunability

Figure 2:
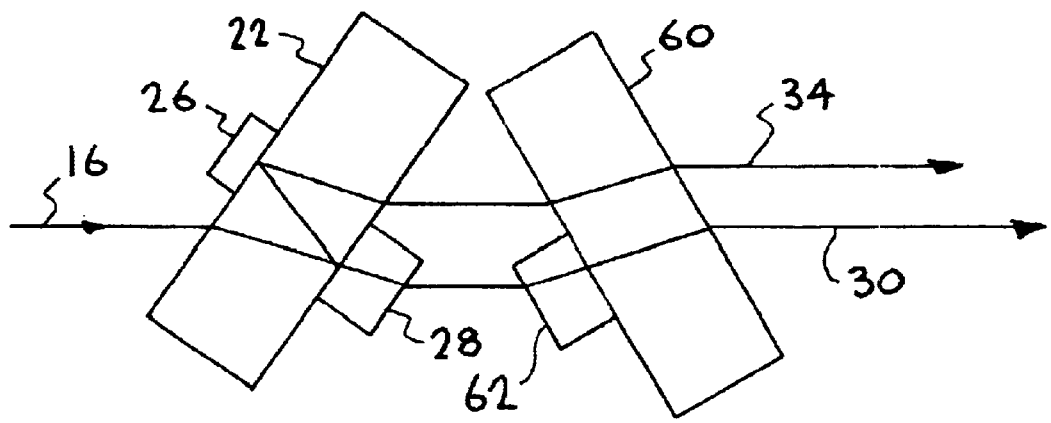
FIG. 2 shows a plane parallel plate (dummy block) added in the optical path.

The wavelength in the bottom output port is determined by the transmission band of the filter, which can be adjusted by changing the incident angle to the filter. In FIG. 1B, if the filter block 22 is slightly rotated along its Y-axis with the pivot at any point in the XZ plane, the angle of incidence of o-ray 16 and e-ray 18 to the filter 28 is changed. The disadvantage of the setup shown in FIGS. 1A and 1B is that, as the incident angle changes, the two output beams shift laterally. The setup shown in FIG. 2 fixes this problem. In FIG. 2, a second dummy block 60 is added in the optical path. The material and thickness of dummy block 60 are the same as these of filter block 22. Dummy glass 62 is added to the bottom beam path to compensate for the thickness of filter 28. When the filter block is rotated, the dummy block 60 is correspondingly rotated in the opposite direction. Such arrangement will guarantee that the bottom beam remains in the same location no matter how the filter block is rotated.

Figure 3A:
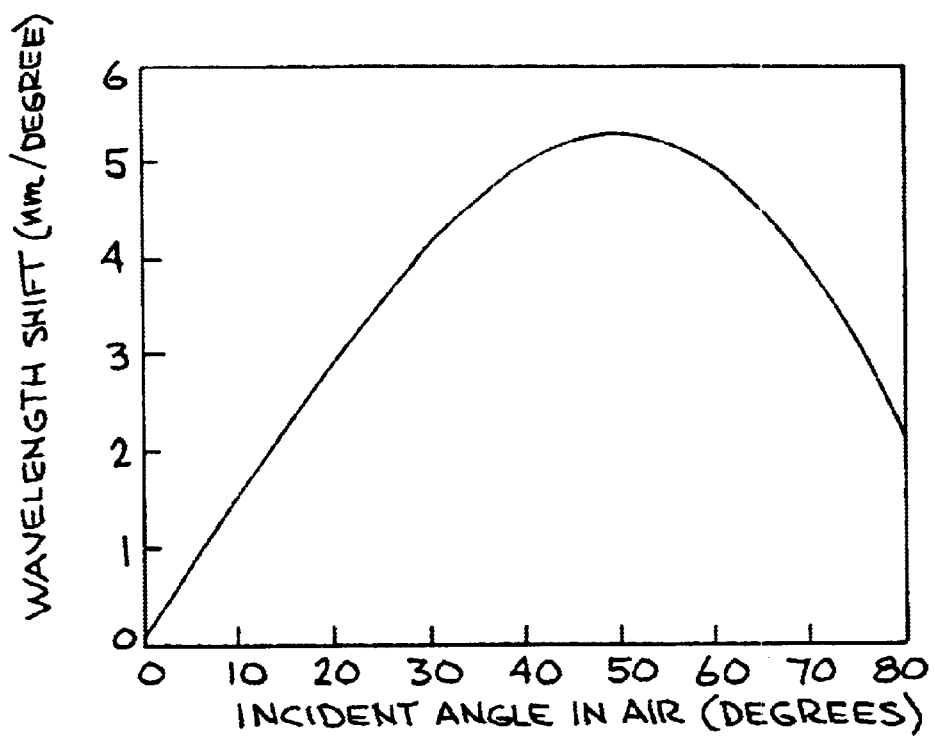
FIG. 3A shows the estimated wavelength shift rate from the center pass band of a filter as a function of incident angle (in air) based on Equation (1).

Equation 1 estimates the dependence of wavelength shift as a function of incident angle.

$$2n^*d \cos\theta = m\lambda$$

$$\sin\phi = n \sin\theta$$

$$\Rightarrow \frac{\Delta\lambda}{\Delta\phi} = -\lambda \left[ \frac{\sin\phi\cos\phi}{n^{*2} - \sin^2\phi} \right]$$

θ: incident angle in the spacer layer of FP filter
φ: incidnt angle in the air
n*: effective refraction index FIG. 3A shows the estimated wavelength shift rate from the center pass band of filter 28 as a function of incident angle (in air) based on Equation (1). At zero degrees incidence, the wavelength shift rate is zero. It is seen that around 50° of incident angle, the wavelength shift rate is maximized, which is about 5 nm/degree. To cover the whole C-band of telecommunication system (1525 nm to 1565 nm),) the filter block has to rotate ±30°.

Figure 3B:
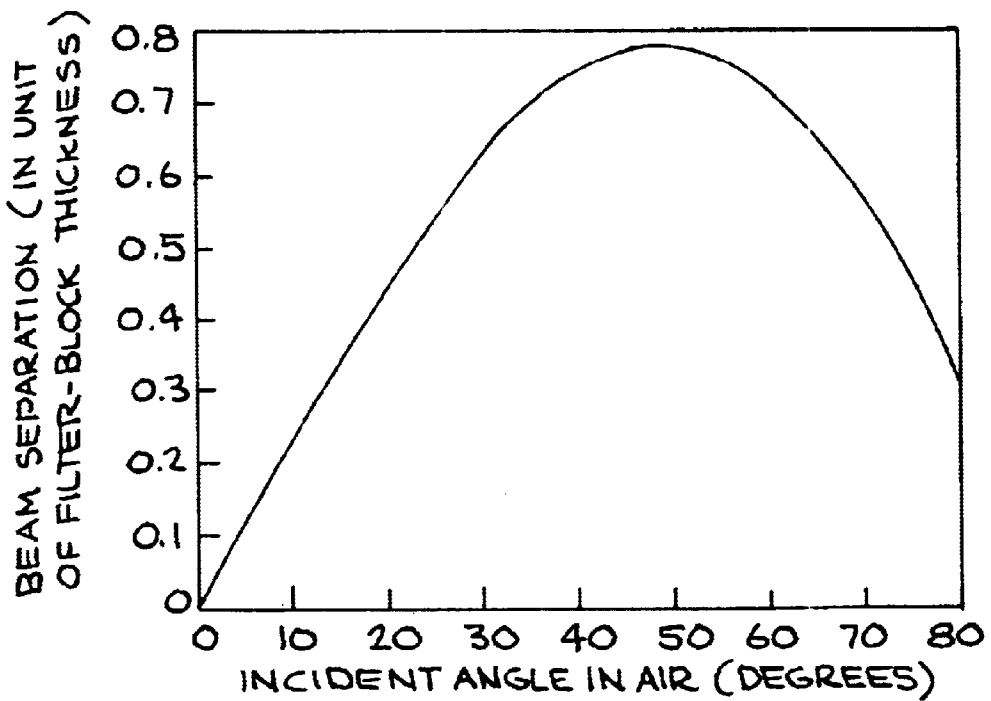
FIG. 3B shows the normalized beam separation, δ/d, as a function of angle of incidence for φ over the range of 0° to 80°.
Figure 3C:
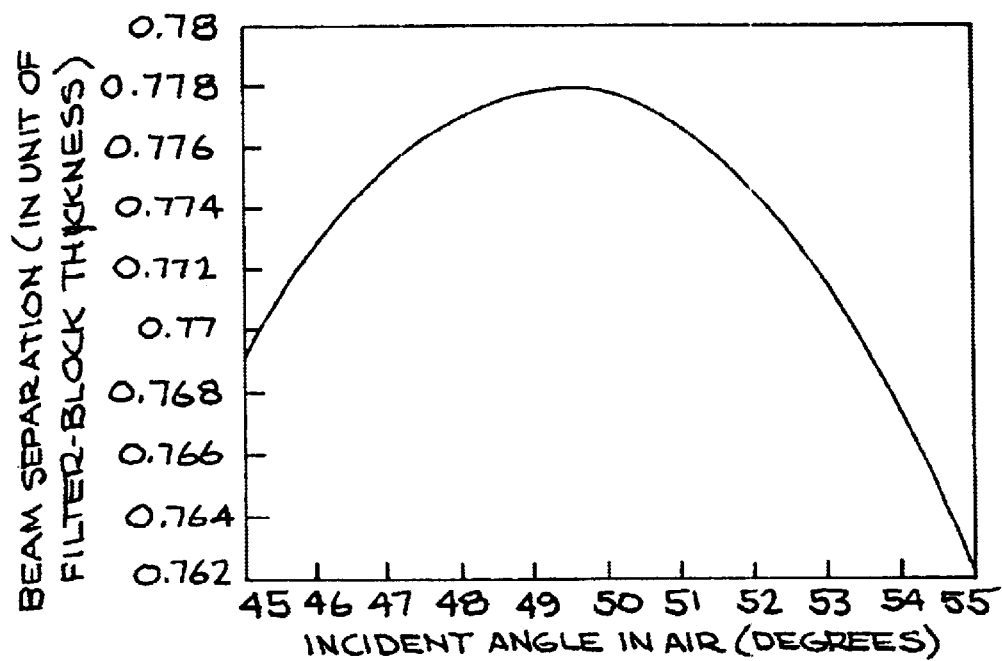
FIG. 3C shows an enlarged view of the area of FIG. 3B for φ over the range of 45° to 55°.

The separation between the top and the bottom beam is expressed as follows.

$$\delta = 2d \tan\psi \cos\phi$$

$$n \sin\psi = \sin\phi$$

$$\Rightarrow \delta = \frac{2d\sin\phi\cos\phi}{\sqrt{n^2 - \sin^2\phi}}$$

ψ: incident angle inside the substrate of filter block
n: refraction index of the substrate of filter block
d: filter block thickness FIG. 3B shows the normalized beam separation, δ/d, as a function of angle of incidence for φ over the range of 0° to 80°. FIG. 3C shows an enlarged view of the area of FIG. 3B for φ over the range of 45° to 55°. It is seen that the maximum beam separation occurs at φ~49.5°, with δ/d= 0.778. When the incident angle is off 3° from 49.5°, δ/d becomes 0.774, which drops about 0.5% from its peak value. By comparing FIG. 3A to FIGS. 3B and 3C, it can be seen that the peak wavelength shift and peak beam separation occurs almost at the same incident angle. With a 3 mm thick filter block, the maximum beam separation in the output port is about 2.334 mm. When the system is operated at 50°±3° of incident angle, the beam separation is in the range of 2.322 to 2.334 mm. The insertion loss due to the 12 μm range beam walk is less than 0.1 dB.

One embodiment of the present invention is a tunable filter that has a filter operation angle of 50°±3°. The filter block substrate could be fused silica having a thickness of 3 mm. The wavelength tuning range of such a device can be designed at 30 nm and the separation of the two beams would be 2.334 mm.

Figure 4:
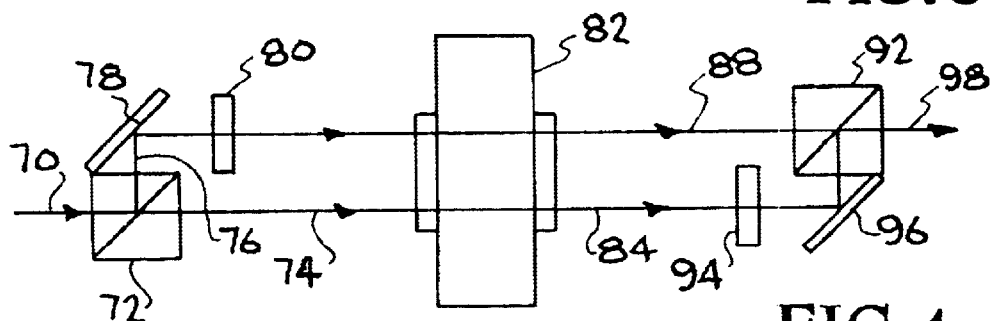
FIG. 4 shows a top view of an embodiment that substitutes a first and second polarizing beamsplitter (PBS) and mirror combination for the wave plates and crystals of the embodiment shown in FIGS. 1A and 1B.

FIG. 4 shows a top view of an embodiment that substitutes a first and second polarizing beamsplitter (PBS) and mirror combination for the crystals 12 and 40 of the embodiment shown in FIGS. 1A and 1B. An incoming beam 70 having a random polarization is normally incident on a PBS 72. The horizontally (P-) polarized beam 74 passes through PBS 72 and the vertically (S-) polarized beam 76 is reflected. The beam 76 reflected from PBS 72 is again reflected from reflector 78 and then passes through ½ wave plate 80, which is oriented to rotate the vertically polarized beam 76 to the horizontal polarization. The beams 74 and 76 pass through filter block 82 which operates on beams 74 and 76 in the same way that filter block 22 operated on beams 16 and 18 in the embodiment of FIGS. 1A and 1B. Thus, beam 74 is acted upon by filter block 82 to produce a top beam 84 and a bottom beam 86 (obscured in this view by top beam 84). Thus also, beam 76 is acted upon by filter block 82 to produce a top beam 88 and a bottom beam 90 (obscured in this view by top beam 88). Horizontally polarized beams 88 and 90 pass through PBS 92. The ½ wave plate 94 rotates the horizontal polarization of beams 84 and 86 to the vertical position so that after reflection from reflector 96, beams 84 and 86 are reflected from PBS 92 such that top beam 84 combines with top beam 88 to produce top output beam 98 and bottom beam 86 combines with bottom beam 90 to produce bottom output beam 100 (obscured in this view by beam 98). Thus, the embodiment of FIG. 4 is a three-port device.

Figure 5:
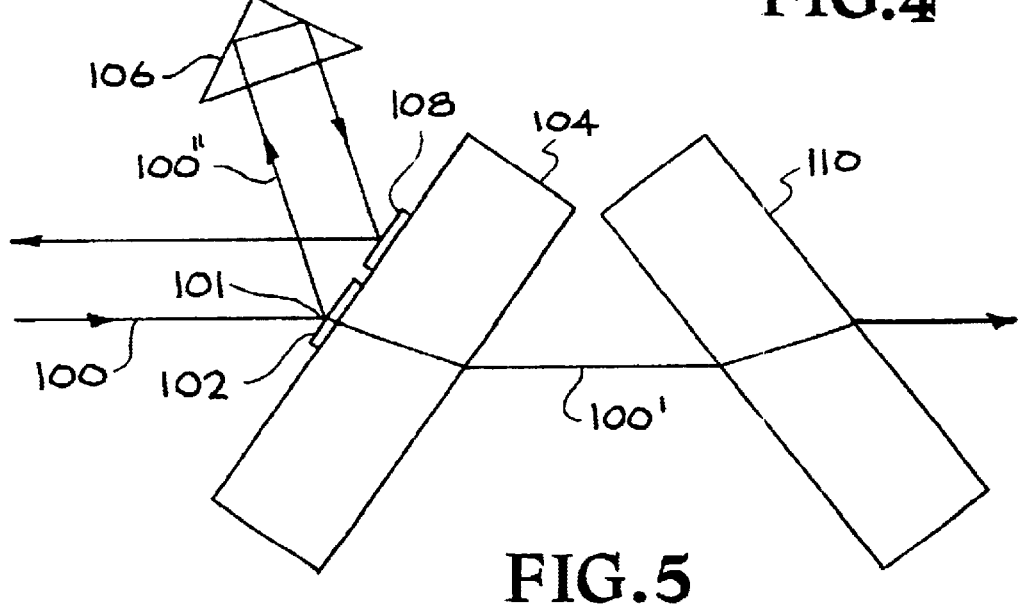
FIG. 5 shows another embodiment where the main beam is collected by a corner cube.

FIG. 5 shows another embodiment where the main beam is collected by a corner cube. The incident beam 100 impinges on the filter coating 102 at center of rotation 101, which is located on filter block 104. Center of rotation 101, in this embodiment, is located along a line on filter coating 102 that is perpendicular to the plane of the page. Only the light (100') having wavelengths within the passband of the filter coating 102 can pass through the filter coating. All the rest of light (100") is reflected by the filter coating and then hits the corner cube 106. The corner cube 106 sends the light 100" back to the filter block 104 where it is reflected by the mirror coating 108 on the filter block 104. The reflected light 100" is directed to the output channel (mainstream). Wavelength tuning is achieved by rotating the filter block 104 with pivot at the intersection between the filter coating 102 and the incident beam 100. At the same time, the corner cube 106 is rotated 2*theta with the same pivot point (i.e., twice the angular rotation as the filter block 104). Under such conditions, the incident angle to the corner cube s stays the same while the filter block is rotating. (The corner cube does not need to be laterally displaced if it is rotated with the pivot at the intersection between the filter coating and the incident beam.) Therefore, the separation between the incident beam 100 and the second output beam (main stream) 100" remains unchanged when the filter block 104 is rotated. As in the embodiment of FIG. 2, the dummy block 110 rotates at an angle theta but in the opposite direction to keep the dropped beam 100' at the same position. As in the embodiments of FIG. 1A, 1B and FIG. 4, this embodiment can be used with birefringent filters and/or polarizing beamsplitters to separate and recombine the o ray and e ray polarization components.

Figure 6:
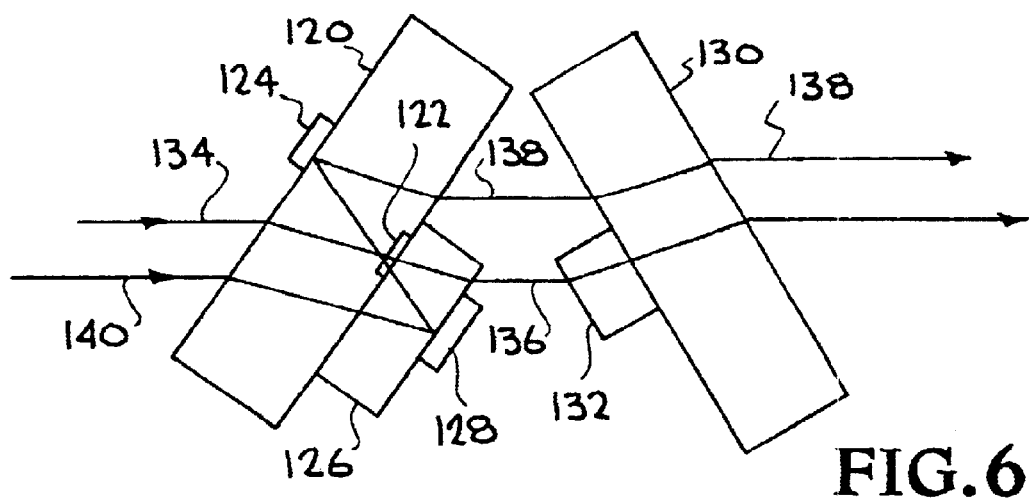
FIG. 6 shows a 4-port device, which can add and drop channels simultaneously.

FIG. 6 shows a 4-port device, which add and drop wavelength channels simultaneously. Filter block 120 has an adherent filter coating or separated filter piece 122 and a mirror 124 and mirror block 126, which has an attached mirror 128. A dummy block 130 with an adherent dummy glass 132 is operatively positioned next to filter block 120. In operation, an input beam 134 passes through filter block 120 and impinges on filter coating 122. Light (136) having wavelengths within the passband of filter coating 122 will pass through the filter coating 122 and will pass through dummy glass 132. The remaining light 138 will be reflected by filter coating 122 and be further reflected by mirror 124, from which the light 138 will propagate through the dummy block 130. An added channel is introduced into the system by injecting a beam 140 through filter block 120 and mirror block 126 so that beam 140 reflects from mirror 128 and is made collinear with beam 138 and propagates therewith out of the system. As in the embodiments of FIGS. 1A, 1B, FIG. 4 and FIG. 5, this embodiment can be used with birefringent filters and/or polarizing beamsplitters to separate and recombine the o ray and e ray polarization components.

In all of the tunable devices described herein, one can remove all the polarization control elements when the device is operating at a small incident angle. When the device is designed for small angle operation, the tuning range is smaller.

Figure 7:
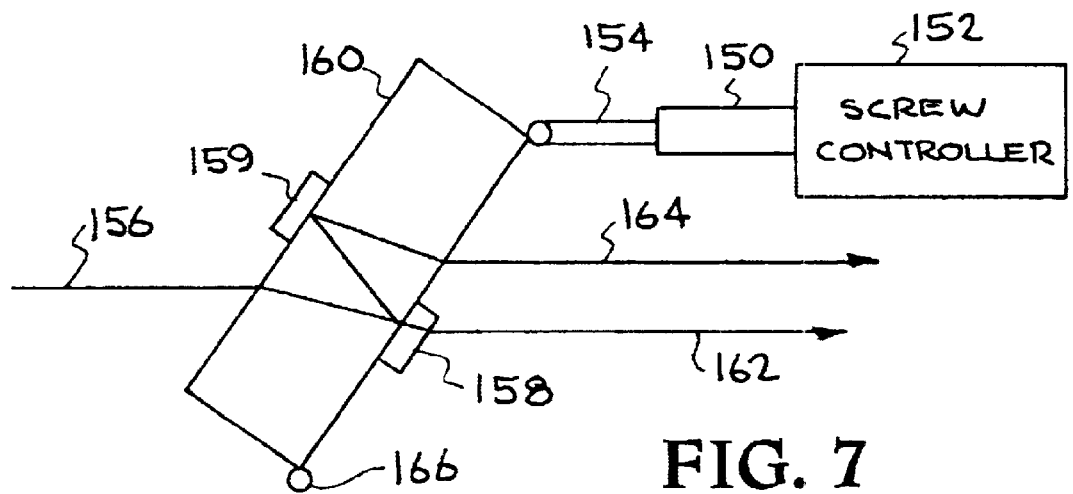
FIG. 7 shows a thermal compensator that is usable in the present invention.

FIG. 7 shows thermal compensator that is usable in the present invention. Normally, the angle of incidence of the filter is set by the screw 150 position, which is controlled by the screw controller 152. As the temperature increases, the length of the thermal compensator 154 increases due to thermal expansion. This makes the angle of incidence of the beam 156 onto the filter 158 to decrease. Assuming that when the incident angle is fixed, higher temperatures shift the filter pass-band to the longer side. Since the incidence angle accordingly decreases, the pass-band wavelength of the device will stay the same. The figure also shows the beam 156 as it propagates through filter block 160 and impinges on drop filter 158. Light 162 that has wavelengths that are within the passband of the filter 158 passes therethrough. Light 164 that reflects from drop filter 158 is then reflected from mirror 159. In the illustrated embodiment, the center of rotation 166 is at the bottom of filter block 160. As in the embodiments of FIGS. 1A, 1B, and FIGS. 4–6, this embodiment can be used with birefringent filters and/or polarizing beamsplitters to separate and recombine the o ray and e ray polarization components.

Figure 8:
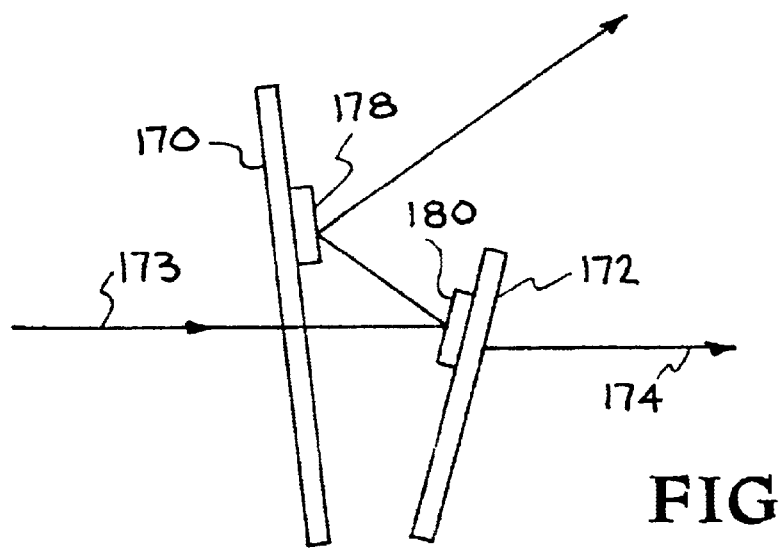
FIG. 8 shows a frame of tunable filter using a plan-parallel-plate formed wedge.

In conclusion, the tunable optical filter of the present invention utilizes the wavelength tunability of bandpass filters and controls the filter incident angle to tune the central wavelength of the filter. Polarization elements are used to make the incident polarization either pure S- or P-polarized. The polarization element includes walk-off crystals, PBSs and wave plates. Plane-parallel plates are used to make the propagation direction of the two output beams independent with the incident angle. Another alternative is to use a plane-parallel-plate formed wedge as a tunable filter frame, shown in FIG. 8, to maintain the propagation direction of the two output beams independent with the incident angle. This scheme is useful to enlarge the separation between the two output beams. By using dual plane-parallel plate 170, 172, the position of the dropped beam 174 is made to be independent of the incident angle of incident beam 173. Plate 170 has an attached mirror 178. Plate 172 has an attached bandpass filter 180.

Using the filter block shown in FIG. 2 or the plane-parallel-plate formed wedge as a tunable filter frame, the directions of the two output beams are independent with the angle of incidence. The location variation of the main beam can be minimized by properly choosing the operation range of the incident angle. In FIG. 2, properly choosing the pivot of rotation makes the beam location on the filter to be independent of the incident angle. When the incident angle is around 45 degrees, the pivot is about d/3 from the front surface of the filter block.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

We claim:

1. A tunable filter, comprising:

means for selecting a range of wavelengths from at least one incident beam of light comprising plurality of wavelengths to produce at least one beam comprising said range of wavelengths and at least one beam comprising the remaining wavelengths, wherein said means for selecting a range of wavelengths is operably rotatable on a pivot of rotation located at about the point where said incident beam of light is incident upon said means for selecting a range of wavelengths to minimize the location variation of said incident beam of light on said means for selecting a range of wavelengths;

means for maintaining the propagation direction of said at least one beam comprising said range of wavelengths; and means for maintaining the propagation direction of said at least one beam comprising the remaining wavelengths, upon any range of wavelength selection.

2. The tunable filter of claim 1, further comprising:
means for collecting said at least one beam comprising said range of wavelengths in a first output port; and
means for collecting said at least one beam comprising the remaining wavelengths in a second output port.

3. The tunable filter of claim 1, wherein said means for selecting a range of wavelengths from at least one incident beam of light comprises a band pass filter.

4. The tunable filter of claim 1, wherein said means for selecting a range of wavelengths comprises a bandpass filter and a mirror and means for operatively positioning said bandpass filter in said at least one incident beam of light, wherein light within the bandpass of said bandpass filter will pass through said bandpass filter to produce said at least one beam comprising said range of wavelengths, wherein said means for selecting a range of wavelengths further comprises means for operatively positioning a mirror to redirect said at least one beam comprising the remaining wavelengths.

5. The tunable filter of claim 4, wherein said means for operatively positioning said bandpass filter and said means for operatively positioning a mirror comprises an optically transparent substrate, wherein said bandpass filter and said mirror are fixedly attached to said substrate.

6. The tunable filter of claim 5, wherein said optically transparent substrate comprises a plane parallel plate.

7. The tunable filter of claim 1, wherein said means for maintaining the propagation direction comprises an optically transparent substrate positioned in the path of said at least one beam comprising said range of wavelengths and in the path of said at least one beam comprising the remaining wavelengths.

8. The tunable filter of claim 6, wherein said means for maintaining the propagation direction comprises a second optically transparent substrate positioned in the path of said at least one beam comprising said range of wavelengths and in the path of said at least one beam comprising the remaining wavelengths, wherein said optically transparent substrate comprises a plane parallel plate.

9. The tunable filter of claim 8, further comprising an third optically transparent substrate positioned in said at least one beam comprising said range of wavelength but not in the path of said at least one beam comprising the remaining wavelengths, wherein said third optically transparent substrate compensates for the thickness of said bandpass filter.

10. The tunable filter of claim 5, further comprising a corner cube positioned to reflect said at least one beam comprising the remaining wavelengths to an output port.

11. The tunable filter of claim 9, further comprising a fourth optically transparent substrate with a second mirror attached thereto fixedly attached to said plane parallel plate, wherein said fourth optically transparent substrate and said second mirror are operatively positioned to combine a second incident beam with said at least one beam comprising the remaining wavelengths.

12. The tunable filter of claim 4, further comprising a thermal compensator operatively in contact with said plane parallel plate to adjust the angle of incidence of said at least one incident beam of light on said bandpass filter as temperature changes shift the pass-band wavelength of said bandpass filter.

13. The tunable filter of claim 1, comprising a first plane parallel plate and a second plane parallel plate that together form a wedge, wherein said means for selecting a range of wavelengths comprises a reflection bandpass filter fixedly attached to said second plane parallel plate, wherein said means for maintaining the propagation direction of said at least one beam comprising said range of wavelengths comprises said first and second plane-parallel plates, wherein said means for maintaining the propagation direction of said beam comprising the remaining wavelength comprises said reflection bandpass filter attached to said second plane parallel plate and a mirror fixedly attached to said first plan parallel plate.

14. The tunable filter of claim 1, comprising a first plane parallel plate and a second plane parallel plate that together form a parallel gap, wherein said means for selecting a range of wavelengths comprises a bandpass filter fixedly attached to said second plane parallel plate, wherein said means for maintaining the propagation direction of said at least one beam comprising said range of wavelength comprises said first and second plane-parallel plates, wherein said means for maintaining the propagation direction of said beam comprising the remaining wavelengths comprises said reflection bandpass filter attached to said second plane parallel plate and a mirror fixedly attached to said first plane parallel plate.

15. The tunable filter of claim 1, further comprising means for separating said at least one incident beam of light into two orthogonally polarized beams of light comprising a first beam and a second beam.

16. The tunable filter of claim 15, wherein said means for separating said at least on incident beam of light into two orthogonally polarized beams is selected from the group consisting of a birefringent crystal and a polarizing beamsplitter.

17. The tunable filter of claim 16, further comprising means for making the polarization of said first beam and said second beam to be parallel to each other.

18. The tunable filter of claim 17, wherein said means for making the polarization of said first beam and said second beam to be parallel to each other comprises a 90 degree rotator positioned in the path of one of the said first beam and said second beam.

19. The tunable filter of claim 18, wherein said means for selecting a range of wavelengths splits said first beam into a third beam and a fourth beam and splits said second beam into a fifth beam and a sixth beam, wherein said at least one beam comprising said range of wavelengths comprises said fourth beam and said sixth beam, wherein said at least one beam comprising the remaining wavelengths comprises said third beam and said fifth beam.

20. The tunable filter of claim 19, further comprising means for combining said third beam with said fifth beam and said fourth beam with said sixth beam.

21. The tunable filter of claim 20, wherein said means for combining comprises a 90 degree rotator for making the polarization of said third beam and said fourth beam to be parallel with the polarization of said fifth beam and said sixth beam.

22. The tunable filter of claim 21, wherein said means for combining further comprises a birefringent crystal.

23. The tunable filter of claim 21, wherein said means for combining further comprises a polarizing beamsplitter.

24. A method, comprising:
selecting a range of wavelengths with means for selecting a range of wavelengths, wherein said range of wavelengths are selected from at least one incident beam of light comprising a plurality of wavelengths to produce at least one beam comprising said range of wavelengths and at least one beam comprising the remaining wavelengths, wherein said means for selecting a range of wavelengths is operably rotatable on a pivot of rotation located at about the point where said incident beam of light is incident upon said means for selecting a range of wavelengths to minimize the location variation of said incident beam of light on said means for selecting a range of wavelengths;

maintaining the propagation direction of said at least one beam comprising said range of wavelengths; and maintaining the propagation direction of said at least one beam comprising the remaining wavelengths, upon any range of wavelength selection.

25. The method of claim 24, further comprising:

collecting said at least one beam comprising said range of wavelengths in a first output port; and collecting said at least one beam comprising the remaining wavelengths in a second output port.

26. The method of claim 24, wherein said means for selecting a range of wavelengths comprises tuning the angle of incidence of said at least one incident beam of light with respect to a band pass filter.

27. The method of claim 24, wherein said means for selecting a range of wavelengths comprises inserting a filter into said at least one incident beam of light, wherein raid filter comprises a desired wavelength pass band.

28. The method of claim 27, wherein said filter is selected from the group consisting of a bandpass filter and a reflectance filter.

* * * * *